(12) United States Patent
Shiflett et al.

(10) Patent No.: US 12,405,806 B1
(45) Date of Patent: *Sep. 2, 2025

(54) DISTRIBUTED AND PARALLEL PROCESSING OF DATA

(71) Applicant: Qintel, LLC, Pittsburgh, PA (US)

(72) Inventors: John Paul Shiflett, Seven Fields, PA (US); Kevin Robert Moore, New Hartford, NY (US); Matthew Karl Geiger, Austin, TX (US)

(73) Assignee: Qintel, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,591

(22) Filed: Apr. 30, 2024

Related U.S. Application Data

(63) Continuation of application No. 17/825,475, filed on May 26, 2022, now Pat. No. 12,001,849.

(51) Int. Cl.
*G06F 9/38* (2018.01)
*G06F 9/50* (2006.01)

(52) U.S. Cl.
CPC .......... *G06F 9/3885* (2013.01); *G06F 9/505* (2013.01); *G06F 9/5072* (2013.01)

(58) Field of Classification Search
CPC ....... G06F 9/3885; G06F 9/505; G06F 9/5072
See application file for complete search history.

(56) References Cited

U.S. PATENT DOCUMENTS

| 8,671,311 B2 * | 3/2014 | Gara | G06F 11/1654 714/10 |
| 10,372,595 B1 * | 8/2019 | Chopra | G06F 11/3688 |
| 2023/0290267 A1 * | 9/2023 | Rosenberg | G06F 9/451 |

OTHER PUBLICATIONS

Jurgens Du Toit, "Logstash Tutorial: How to Get Started", Logz.io, Jun. 9, 2020, 20 pages, Logz.io.

* cited by examiner

*Primary Examiner* — Michael A Keller
(74) *Attorney, Agent, or Firm* — FERENCE & ASSOCIATES LLC

(57) ABSTRACT

One embodiment provides a method for distributed and parallel processing of data within a data processing platform. The platform receives the data to be processed by the data processing platform. The data processing platform includes a plurality of processing components. The plurality of processing components ingest the data. At least two of the plurality of processing components ingest the data simultaneously. At each of a subset of the plurality of processing components an output is generated from the data by processing the data. Each output includes an identifier indicating the output corresponds to the data. A downstream component receives the output from each of the at least a subset of the plurality of processing components.

20 Claims, 3 Drawing Sheets

DISTRIBUTED AND PARALLEL PROCESSING OF DATA

CROSS REFERENCE TO RELATED APPLICATION

This application is a continuation application of co-pending U.S. patent application Ser. No. 17/825,475, filed May 26, 2022, entitled "DISTRIBUTED AND PARALLEL PROCESSING OF DATA," the content of which is incorporated herein by reference as if set forth in its entirety.

BACKGROUND

In order to learn more about data, the data is usually processed using one or more processing activities. The processing activities may analyze the data to identify additional information about the data. For example, if the data is an image, one or more processing activities may be utilized to identify text within the image, people and/or landmarks within the image, metadata corresponding to the image, and/or the like. As another example, if the data is a text document, one or more processing activities may be utilized to identify a sentiment of the document, a topic of the document, entities contained within the documents, and/or the like. Depending on the desired analysis, the number of processing activities can be substantial.

BRIEF SUMMARY

In summary, one aspect provides a method for distributed and parallel processing of data within a data processing platform, the method including: receiving, at the data processing platform, the data to be processed by the data processing platform, wherein the data processing platform comprises a plurality of processing components; ingesting, at the plurality of processing components, the data, wherein the ingesting occurs simultaneously between at least two of the plurality of processing components; generating, at each of at least a subset of the plurality of processing components, an output from the data by processing the data, wherein each output comprises an identifier indicating the output corresponds to the data; and receiving, at a downstream component of the data processing platform, the output from each of the at least a subset of the plurality of processing components.

Another aspect provides a system for distributed and parallel processing of data within a data processing platform, the system including: a processor; a memory device that stores instructions that, when executed by the processor, causes the system to: receive, at the data processing platform, the data to be processed by the data processing platform, wherein the data processing platform comprises a plurality of processing components; ingest, at the plurality of processing components, the data, wherein the ingesting occurs simultaneously between at least two of the plurality of processing components; generate, at each of at least a subset of the plurality of processing components, an output from the data by processing the data, wherein each output comprises an identifier indicating the output corresponds to the data; and receive, at a downstream component of the data processing platform, the output from each of the at least a subset of the plurality of processing components.

A further aspect provides a product for distributed and parallel processing of data within a data processing platform, the product including: a computer-readable storage device that stores executable code that, when executed by a processor, causes the product to: receive, at the data processing platform, the data to be processed by the data processing platform, wherein the data processing platform comprises a plurality of processing components; ingest, at the plurality of processing components, the data, wherein the ingesting occurs simultaneously between at least two of the plurality of processing components; generate, at each of at least a subset of the plurality of processing components, an output from the data by processing the data, wherein each output comprises an identifier indicating the output corresponds to the data; and receive, at a downstream component of the data processing platform, the output from each of the at least a subset of the plurality of processing components.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
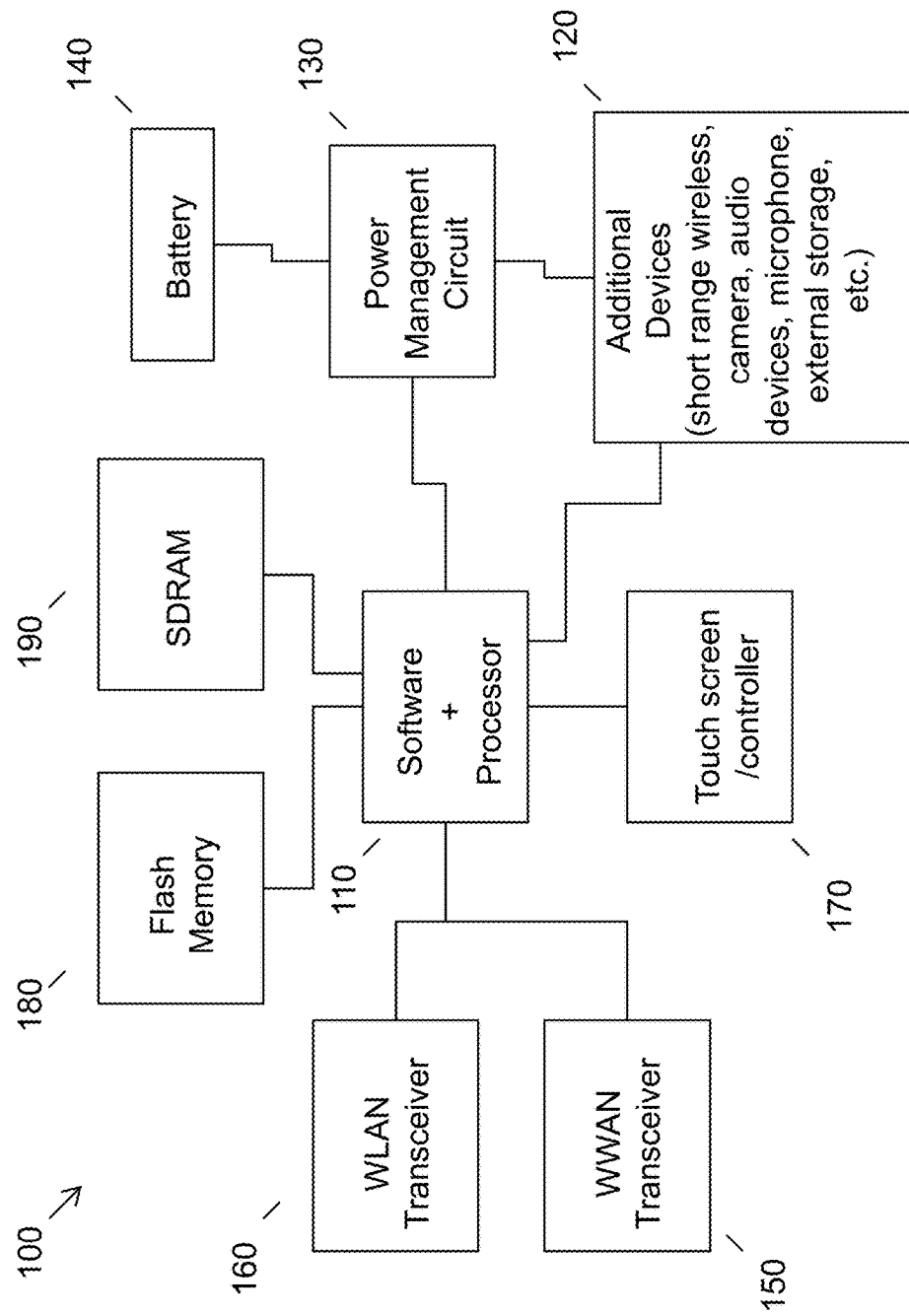
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When performing processing activities on data, the processing is performed by one or more processing components. In order to make the processing more efficient, a system may include more than one processing component, where each processing component is directed to a particular processing activity. For example, one processing component may be directed to metadata extraction, one processing component may be directed to information extraction, one processing component may be directed to natural language processing, one processing component may be directed to image analysis, and/or the like. Since each processing component is directed to a single function or group of related functions, the processing by that component may be more efficient than using a single processing component for performing all different processing activities.

However, having multiple processing components results in an increased complexity in controlling and tracking the data as it is processed through the multiple processing components. Thus, in conventional techniques, the data processes through the processing components in a sequential fashion where the data is processed and output by one processing component and then input into another processing component until all processing that is desired on the data has been performed and a final output is created including the data and all processing outputs generated from the processing. However, this results in a very time-consuming process for completely processing the data, particularly if the desired processing is complex and requires processing through many different processing components. Additionally, if one of the processing components within the sequential process is unable to process the data for some reason, for example, the data does not include information processable by the processing component, the data will be stopped and all processing on the data will be stopped until a user intervenes in the processing process and addresses the processing problem.

Additionally, another problem that occurs that may result in the processing component not being able to process the data is that data is presented in a format that is not readable by the processing component. Generally, the processing components are programmed to accept input in a particular format and if the data is not in that format, the processing component will be unable to process the data. Conventionally, the solution is to reprogram the processing component to accept the format of the data, which is a very time-consuming endeavor. The other solution is to have multiple processing components that all perform substantially the same processing, but that can each accept different data formats. The data then has to be sent to the correct processing component that accepts the format of the data. However, this results in having multiple, redundant processing components that all perform essentially the same function but that require their own processing resources, memory resources, and/or other resources, due to different data format requirements, thereby significantly increasing the processing, memory, and/or other resource requirements of the system. Additionally, these conventional techniques require duplicate code to address all different formats of data which requires time consuming programming and highly skilled programmers.

Accordingly, the described system and method provides a technique for distributed and parallel processing of data within a data processing platform using a plurality of processing components. The data processing platform receives the data to be processed by the platform. The platform includes a plurality of processing components that can each perform a processing activity. The data is ingested at the plurality of processing components, which may be a subset of the processing components or all of the processing components. The processing components that ingest the data can ingest the data simultaneously. In other words, the same data can be presented to and processed by the processing components at the same time as other of the processing components, thereby providing for concurrent processing of the data by multiple components in parallel which will be referred to herein as parallel processing of the data.

At least some of the processing components generate an output from the data by processing the data. The processing components that can process the data will generate an output, whereas processing components that cannot process the data will not generate an output. Those outputs that are generated include an identifier or marker that indicates the output corresponds to the data. In other words, the output is marked so that a downstream component, user, other processing component, and/or the like, can determine that it belongs to the data. Thus, a user or the system can identify all the outputs that belong to the data. The outputs are received at a downstream component, which may include a data storage location, a downstream processing component, another of the processing components, and/or the like. The outputs can be aggregated, based upon identification that the outputs correspond to the data, and then processed, stored, displayed, and/or the like, at the downstream processing component.

Therefore, a system provides a technical improvement over traditional methods for data processing. Rather than conventional systems which process data in a linear fashion, the described system and method provide a technique that allows for processing of data in a distributed and parallel fashion across a plurality of processing components. The described data processing platform of the described system allows for the connection of the processing components to each other, thereby allowing for multiple inputs into a processing component and the output from a processing component to be sent to multiple downstream components, which may include another of the processing components. This distributed and parallel processing provides a technique for processing data more efficiently and quicker than conventional linear processing systems.

Additionally, since the data processing platform includes a plurality of generic input formats, the data processing platform does not have to be modified to receive data that is in a format that had not been previously processed by the platform. This allows for the use of a single processing component across multiple different input format types, thereby reducing the redundancy of processing components and processing, memory, and other resources as required in conventional systems. Additionally, since the data can be sent to multiple processing components at a time and each component does not rely on another of the components, the system provides that if a processing component cannot process the data for one or more reasons, the processing component will simply not process the data and move to processing other data. Thus, any other processing components will not be prevented from processing the data due to a hold up of the data at a processing component that cannot or will not process the data.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110.

Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
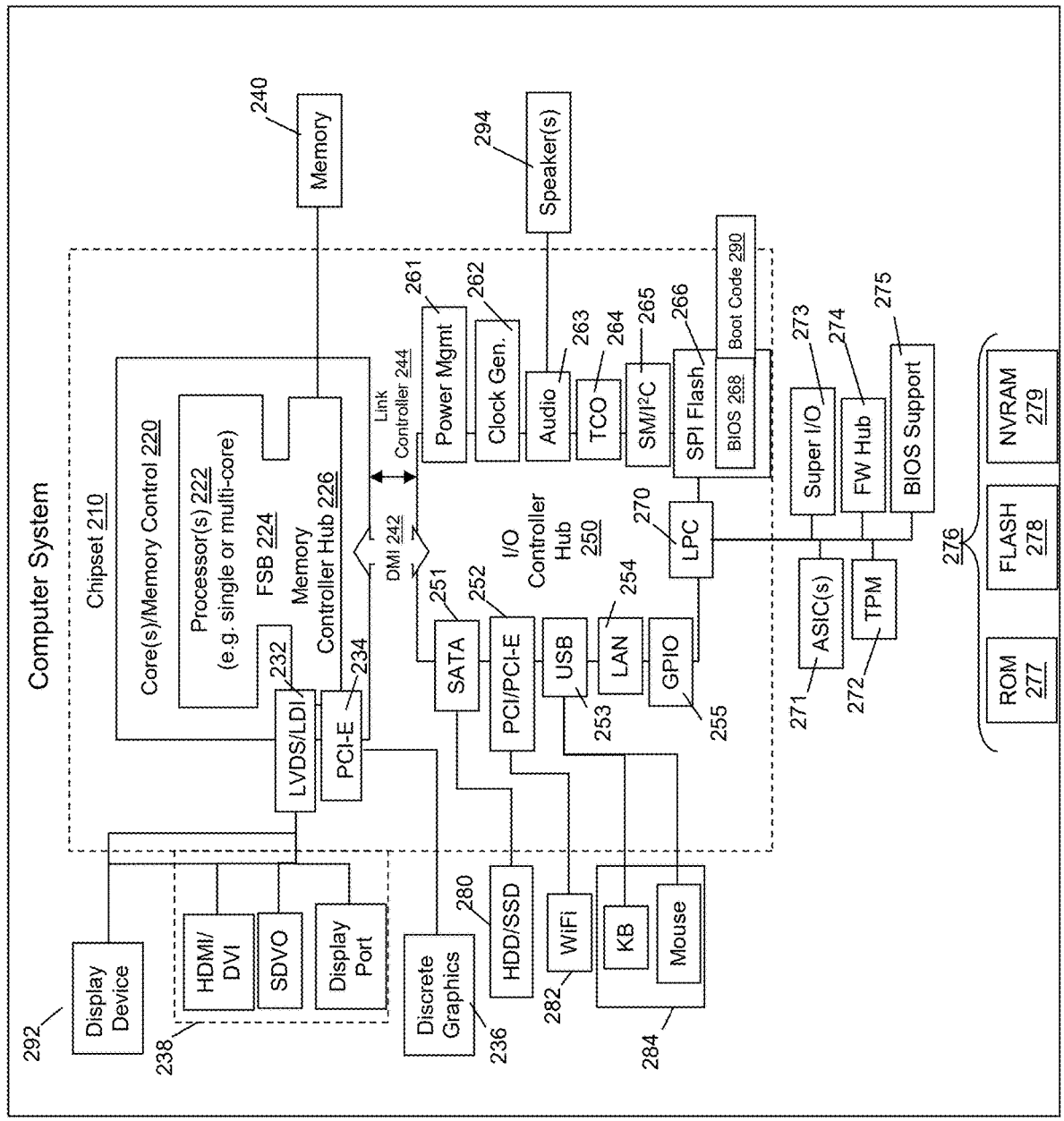
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for processing data. For example, the circuitry outlined in FIG. 1 may be implemented in a tablet or smart phone embodiment, whereas the circuitry outlined in FIG. 2 may be implemented in a personal computer embodiment.

Figure 3:
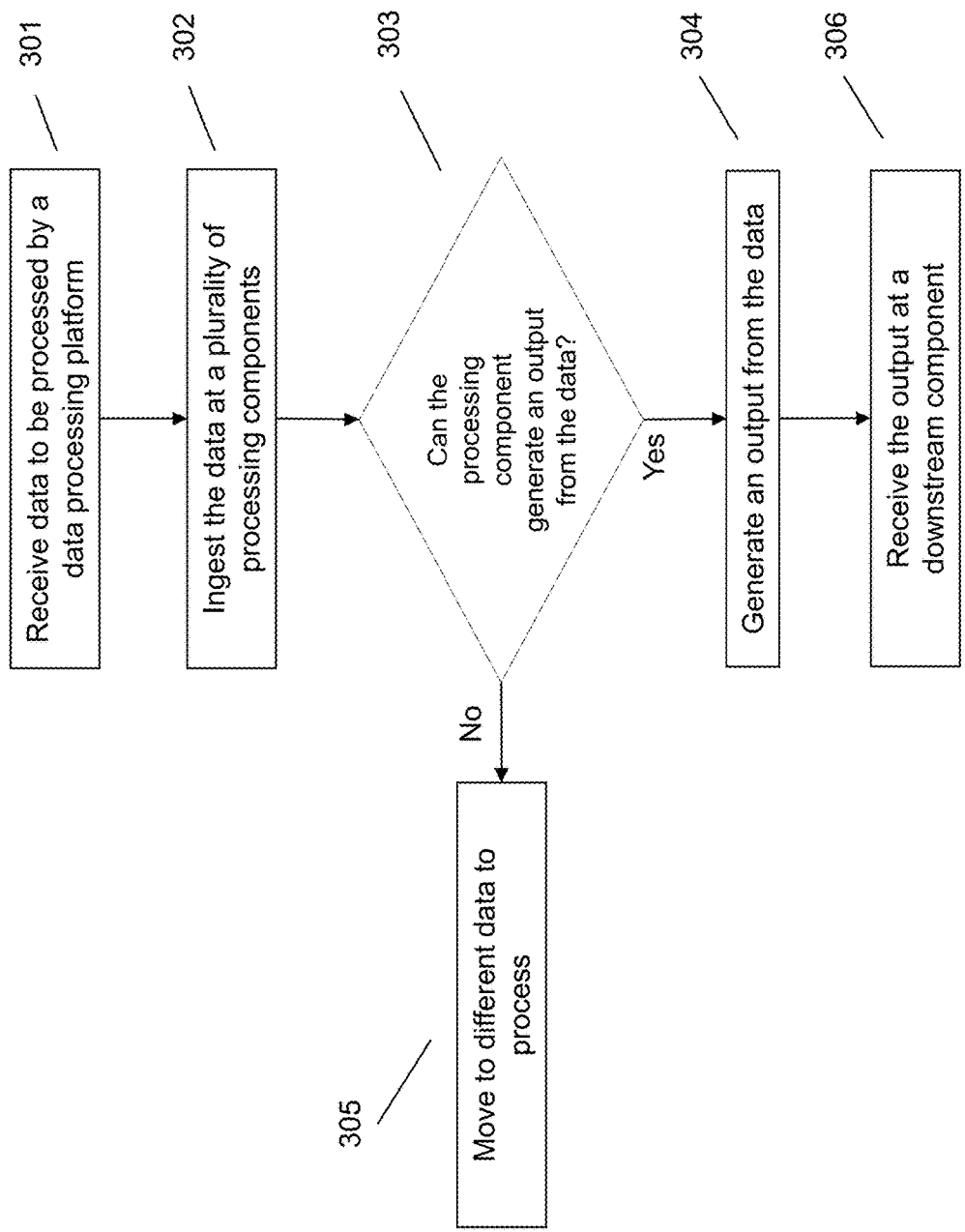
FIG. 3 illustrates an example method for distributed and parallel processing of data within a data processing platform using a plurality of processing components.

FIG. 3 illustrates an example method for distributed and parallel processing of data within a data processing platform using a plurality of processing components. The method may be implemented on a system which includes a processor, memory device, output devices (e.g., display device, printer, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the system itself is specifically programmed to perform the functions as described herein to perform distributed and parallel processing of data. Additionally, the data processing platform includes modules and features that are unique to the described system.

The data processing platform includes a plurality of processing components. Each of the processing components corresponds to one or more processing activities. The processing components may correspond to a broad class of processing activities (e.g., image processing, text processing, information extraction, etc.), may correspond to specific processing activities (e.g., using a broad class of image processing, the specific processing activities may include, landmark identification, people identification, object identification, etc.), and/or a combination thereof (e.g., some processing components cover broad processing activities, some processing components cover specific processing activities, etc.). It should also be noted the processing components may include processing components for specific processing activities and for the broader processing activity. In other words, and as an example, the data processing platform may include a processing component that performs image processing and may also include processing components that perform specific image processing activities. In such an example, the data processing platform may include components for each of all possible specific processing activities, or may only include components for some of the specific processing activities.

Additionally, the data processing platform can include multiple processing components that can perform the same or a similar processing activity in the case that one component cannot fulfill all of the data processing that may be needed. However, each of these components does not only accept a single data format and, instead, can perform processing activities on any data received by the system. Additionally, some processing components may perform multiple processing activities across processing activity classes. For example, a processing component may be capable of performing both image processing activities and text processing activities. Thus, the data processing platform and processing components are flexible and can include as many processing components as necessary for performing desired data processing.

Unlike conventional data processing systems that process data in a linear fashion, moving from one processing activity or component to another, the data processing platform allows for distributed and parallel processing. Accordingly, the processing components of the data processing platform are interconnected and dynamic. Each of the processing components can operate independently from other processing components in that other processing components can feed into any and all other processing components. Thus, instead of processing data in the linear fashion of conventional data processing systems, the described system provides more dynamic data processing and also allows for parallel processing of the data within multiple processing components simultaneously. Additionally, since the data processing platform includes many different processing components, each of the processing components can perform a different processing activity on the data, thereby providing a distributed data processing system as opposed to conventional system where a single or very few processing components are utilized for performing the data processing.

At 301, the data processing platform receives data to be processed by the data processing platform. Receiving the data may include receiving the data from a user manually providing the data to the platform, accessing an accessible data storage repository containing the data, receiving a pointer or link to a location of the data, or otherwise obtaining the data. The data processing platform is designed to have multiple generic data input formats. This allows for the receipt of data in any of a plurality of different input formats. Accordingly, receiving the data may include determining the data is of a data input format that is processable by the data processing platform. Additionally, since the data input formats are generic, if the data does not fit exactly within one of the generic formats, the data can be slightly modified to fit within one of the generic formats. Accordingly, receipt of the data may include verifying the format of the data to ensure the data fits within one of the generic data input formats. If the data does not fit within one of the generic input formats, receipt of the data may include modifying the data to fit within one of the generic data input formats.

Additionally, since the platform is designed to have multiple generic different input formats, the infrastructure of the platform is designed to handle any multitude of inputs. Thus, when any new inputs, services, platforms, data processing components, and/or the like, are integrated into the platform, the integration is very simple. Instead of having to redesign or reprogram the platform to accept the new inputs, services, platforms, components, and/or the like, as would be necessary in conventional data processing systems, the platform can simply accept the new inputs, services, platforms, components, and/or the like. This ease of integration makes the platform very dynamic and able to be easily modified without time-consuming reprogramming and/or redevelopment. In other words, the platform and generic input (and output) formats provide the ability to dynamically receive a new input, service, platform, component, process, and/or the like, and integrate it into the process flow without having to perform a whole rewrite or make substantial changes to the underlying process flow and/or platform infrastructure.

At 302, the data is ingested at one or more of the processing components of the data processing platform. In other words, the data is sent to and received by the plurality of processing components. It should be noted that the data does not have to be sent to all processing components of the platform. Thus, while the data may be sent to all processing components, the data may also be sent to a subset of the processing components. The processing components that are selected to receive the data may be dependent on the type or other attribute of the data that is being processed. Types and attributes of data may include, but are not limited to, a data modality (e.g., image, text, video, audio, etc.), a data category or topic (e.g., news article, landscape image, presentation, specific data topic, etc.), a source of the data, a date of the data, and/or the like. In other words, the data types and/or attributes are any characteristics of the data that can be used to classify the data into one or more categories or groups of similar data.

The identified types and/or attributes can then be used to send the data to one or more processing components. For example, if the data is an image, the data may be sent to processing components that perform image processing activities. The data may also be sent to more than one group of processing components. For example, if the data includes characteristics that cause the data to fit into more than one category, the data may be sent to processing components that correspond to each of the categories. The types and/or attributes may also indicate that different processing components would perform a more optimized processing of the data (e.g., faster processing of the data as compared to another component, more detailed processing of the data as compared to another component, etc.) and may, therefore, be sent those identified processing components. For example, some processing components may utilize different resources (e.g., memory, processing, etc.) than other components which may provide benefits over the other components. Additionally, or alternatively, the data may simply be sent to all processing components or a set of components that can process any aspects that may be included in the data.

Accordingly, the data may be sent to and received by more than one processing component at the same time. In this case, same time or simultaneously refers to some overlap in a time that the data is located at more than one processing component. In other words, the data does not have to be sent to or located at all of the processing components at the same time for the same length of time. Rather, the data is simply located at or being processed by more than one processing component at a single time. Accordingly, as an example, if the data is sent to one processing component at one time and then sent to another processing component at a later time, but while the data is still at or being processed by the first processing component, this would be considered simultaneously. As another example, if one processing component finishes processing the data before another processing component, the fact that the data was located at or processed by more than one processing component at a same time is considered simultaneously. Thus, the data can be processed at multiple processing components simultaneously, thereby providing concurrent processing of the data by multiple components in parallel, also referred to as parallel processing of the data.

It should be noted that the platform can also process data that will progress through the platform in a linear fashion, for example, based upon restrictions of the data, restrictions on outputs of the data, and/or the like. For example, the processing may need to occur on a particular output of the data, rather than the base data. Thus, the data would be sent to the processing component that can generate the needed output before being sent to other processing components. The platform can also process data that will only be processed by a single processing component.

At 303, each of the processing components that received the data determines if the component can generate an output from the data. To determine if a processing component can process the data, the component may analyze the data to determine if it is processable by the component, for example, based upon attributes of the data, based upon a format of the data, and/or the like. The component may also analyze the data to determine if it is data that should be processed. In other words, the processing component can perform filtering of the data and determine if the data is malicious, if the data is corrupted and not processable in the current format, and/or the like.

If a processing component that received the data cannot process the data, the processing component may move to different data to process at 305. In other words, a processing component being unable to process data will not prevent the processing component from moving on from the data and processing new or different data. The processing component may not be able to process the data if the data does not include information that is processed by the processing component. For example, if the processing component processes text and the data does not include any text, the processing component will be unable to process the data. The processing component may also be unable to process the data if the data is in a format that is unreadable by the processing component. The processing component may also determine that the data should not be processed by the component, for example, because it is corrupt, includes corruptible or malicious data, and/or the like, and may, therefore, not process the data.

In the event that the data is not processed by a processing component, a user may be notified that the data was not processed by the processing component. In addition to notifying the user that the data was not processed by a particular component, the notification may also identify why the data was not processed by the component. This allows the user to intervene in the process flow if the user determines that intervention is required.

On the other hand, if the data can be processed by the component, each processing component that can process the data generates an output from the data by processing the data based upon the processing activity of the processing component at 304. The processing components that can process the data may be fewer than the number of components that received the data. On the other hand, all processing components may be able to process the data and may, therefore, generate an output from the data that corresponds to the activity of the component. In other words, processing of the data and output generation from the data may occur at a subset of the components that received the data. It should be noted that the subset can include all of the processing components that received the data or may include a fewer number of processing components that received the data.

Since the processing component can determine if the component can process the data, the platform allows for the processing to be automated, whereas in conventional systems the data would have to be manually added to each separate process. In other words, since the processing component can filter the data, the data can simply be provided to a component which will then determine if the data can be processed by the component.

When generating the output, each processing component may incorporate an identifier into the output. The identifier indicates the output corresponds to the data. In other words, the components may incorporate an identifier, for example, hash, fingerprint, identification number, and/or the like, that identifies the output was generated from the data. The identifier will be generated in a manner that is known by a downstream component such that the downstream component can identify all outputs that correspond to particular data. In other words, since multiple components can process the data at the same time, in order to ensure that outputs are kept with or attributable to the same data, the components include a data identifier so that it can be identified which data the output corresponds to. This allows a downstream component to be able to aggregate the outputs that correspond to particular data.

Thus, even though processing components operate independently from other processing components, the processing components are processing the same data at the same. Accordingly, the processing components can work together to make a secondary determination about what happens to the data after the data is processed by the components. In other words, the processing components that processed the data work together or collaborate so that the output from all the components is combined together or similarly identified or marked so that all outputs corresponding to the same data can be identified and aggregated.

At 306, the downstream component of the data processing platform receives the output from each of the processing components that processed the data. Since some processing components that received the data may not provide an output from the data because the component could not process the data, the downstream component will not receive an output from that component. However, the fact that the downstream component is missing an output will not prevent the downstream component from processing the outputs that were received. The type of processing that is performed on the outputs is dependent on the downstream component. The downstream component may include, but is not limited to, a data storage location or repository, a downstream processing component, another of the plurality of processing components, a component providing instructions for displaying an output, and/or the like. The downstream component may aggregate the outputs from the processing components based upon the data the outputs correspond to. In other words, the downstream component can aggregate outputs that all correspond to the same data. To identify the data that an output corresponds to, the downstream component may utilize the identifiers that are attached to the output.

It should be noted that a downstream processing component and another of the processing components may be different types of components. A downstream processing component includes a processing component that aggregates outputs and processes the aggregated outputs. Another of the processing components, on the other hand, is one of the processing components that processes an output or the data and an output of the data. For example, if one processing component extracts metadata and another processing component analyzes metadata, the another processing component is not a downstream processing component because it is only processing the metadata and not an aggregation of the metadata with all other outputs from the other processing components. The another processing component may combine outputs from multiple processing components, but is distinguished from the downstream processing component in that it will not aggregate all outputs and that it will provide an output that will be aggregated by a downstream component with other outputs of processing components.

The output may be received at more than one downstream component. In other words, like inputs can be received at multiple processing components, outputs can be provided to multiple downstream components. Additionally, like the inputs, the platform provides that data will be output from the processing components in a format that fits one or more generic data output formats defined by the platform. This ensures that downstream components will be able to manipulate the data (e.g., aggregate, store, display, process, etc.) as needed by the downstream component.

Since the platform provides for distributed and parallel processing of the same data, it is useful to track the data and generated outputs through the data processing platform. In other words, since the data does not necessarily flow through the data processing platform in a linear fashion and multiple processing components can process the data at a single time, it is helpful to be able to track the data to identify the path that was taken through the data processing platform, what processing was performed or attempted to be performed on the data, what outputs were generated from the data, and/or the like. Thus, the data processing platform may include or be in operative communication with a central management storage system. The central management storage system gives the platform the ability to track where data have gone in the platform, what the data have done within the platform, and/or the like, so that a picture of where data are in the data flows is provided. In other words, the central management storage system tracks the data through the platform and stores basic processing metadata or relationships between the data (e.g., source and destination, input and output, etc.), so that some level of auditing regarding how the data process through the platform is provided. An example central management system is described in commonly-owned application Ser. No. 17/825,166, entitled "CENTRAL SYSTEM FOR COMPUTER SYSTEM SECURITY ASSESSMENT" and filed on the same day as this application, the contents of which are incorporated by reference herein as if set forth fully herein. Additionally, a technique for identifying and storing data and relationships between relationships is described in commonly-owned application Ser. No. 17/825,716, entitled "GENERATION AND STORAGE OF DATA RELATIONSHIPS" and filed on the same day as this application, the contents of which are incorporated by reference herein as if set forth fully herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for distributed and parallel processing of data within a data processing platform, the method comprising:
   receiving, at the data processing platform comprising a plurality of generic data input formats, the data to be processed by the data processing platform, wherein the data processing platform comprises a plurality of processing components, wherein the receiving comprises determining the data is of a data input format fitting at least one of the plurality of generic data input formats;
   ingesting, at the plurality of processing components, the data, wherein the ingesting comprises the data being located at more than one of the plurality of processing components simultaneously;
   processing, simultaneously at the more than one of the plurality of processing components, the data, wherein the processing comprises incorporating, by each of the more than one of the plurality of processing components, an identifier into an output of the processing of the data, the identifier identifying a source data of the output, wherein the output is provided in a format that fits at least one generic data output; and
   receiving, at a downstream component of the data processing platform, the output from each of the plurality of processing components that processed the data.

2. The method of claim 1, wherein the receiving the output comprises aggregating, using the data processing platform, the outputs corresponding to the data based upon the identifiers.

3. The method of claim 1, wherein the downstream component comprises at least one of a data storage location and a downstream processing component.

4. The method of claim 1, wherein the receiving the output comprises receiving output at a plurality of downstream components.

5. The method of claim 1, wherein the generating an output comprises identifying at least one of the plurality of processing components cannot process the data and generating no output at that at least one of the plurality of processing components.

6. The method of claim 5, comprising notifying a user the data cannot be processed as the at least one of the plurality of processing components.

7. The method of claim 1, wherein the determining the data is of a data input format fitting at least one of the plurality of generic data input formats comprises modifying the data to fit within at least one of the plurality of generic input formats.

8. The method of claim 1, wherein the processing comprises identifying the downstream component based upon collaboration between the subset of the plurality of processing components and processing the data based upon the identified downstream component.

9. The method of claim 1, wherein the receiving the output comprises storing outputs corresponding to the same source data within a data storage location.

10. The method of claim 1, wherein the downstream component comprises another of the plurality of processing components.

11. A system for distributed and parallel processing of data within a data processing platform, the system comprising:
    a processor;
    a memory device that stores instructions that, when executed by the processor, causes the system to:
    receive, at the data processing platform comprising a plurality of generic data input formats, the data to be processed by the data processing platform, wherein the data processing platform comprises a plurality of processing components, wherein the receiving comprises determining the data is of a data input format fitting at least one of the plurality of generic data input formats;
    ingest, at the plurality of processing components, the data, wherein the ingesting comprises the data being located at more than one of the plurality of processing components simultaneously;
    process, simultaneously at the more than one of the plurality of processing components, the data, wherein the processing comprises incorporating, by each of the more than one of the plurality of processing components, an identifier into an output of the processing of the data, the identifier identifying a source data of the output, wherein the output is provided in a format that fits at least one generic data output; and
    receive, at a downstream component of the data processing platform, the output from each of the plurality of processing components that processed the data.

12. The system of claim 11, wherein the receiving the output comprises aggregating, using the data processing platform, the outputs corresponding to the data based upon the identifiers.

13. The system of claim 11, wherein the downstream component comprises at least one of a data storage location and a downstream processing component.

14. The system of claim 11, wherein the receiving the output comprises receiving output at a plurality of downstream components.

15. The system of claim 11, wherein the generating an output comprises identifying at least one of the plurality of processing components cannot process the data and generating no output at that at least one of the plurality of processing components.

16. The system of claim 15, comprising notifying a user the data cannot be processed as the at least one of the plurality of processing components.

17. The system of claim 11, wherein the determining the data is of a data input format fitting at least one of the plurality of generic data input formats comprises modifying the data to fit within at least one of the plurality of generic input formats.

18. The system of claim 11, wherein the processing comprises identifying the downstream component based upon collaboration between the subset of the plurality of processing components and processing the data based upon the identified downstream component.

19. The system of claim 11, wherein the receiving the output comprises storing outputs corresponding to the same source data within a data storage location.

20. A product for distributed and parallel processing of data within a data processing platform, the product comprising:
- a computer-readable storage device that stores executable code that, when executed by a processor, causes the product to:
- receive, at the data processing platform comprising a plurality of generic data input formats, the data to be processed by the data processing platform, wherein the data processing platform comprises a plurality of processing components, wherein the receiving comprises determining the data is of a data input format fitting at least one of the plurality of generic data input formats;
- ingest, at the plurality of processing components, the data, wherein the ingesting comprises the data being located at more than one of the plurality of processing components simultaneously;
- process, simultaneously at the more than one of the plurality of processing components, the data, wherein the processing comprises incorporating, by each of the more than one of the plurality of processing components, an identifier into an output of the processing of the data, the identifier identifying a source data of the output, wherein the output is provided in a format that fits at least one generic data output; and
- receive, at a downstream component of the data processing platform, the output from each of the plurality of processing components that processed the data.

* * * * *